United States Patent [19]

Hoeppner

[11] 4,070,605

[45] Jan. 24, 1978

[54] POLYPHASE POWER CONTROL

[75] Inventor: Conrad H. Hoeppner, Indialantic, Fla.

[73] Assignee: McNeil Corporation, Akron, Ohio

[21] Appl. No.: 645,941

[22] Filed: Jan. 2, 1975

Related U.S. Application Data

[63] Continuation-in-part of Ser. No. 495,783, Aug. 8, 1974, abandoned.

[51] Int. Cl.² ............................................. H02P 5/40
[52] U.S. Cl. .................................. 318/227; 318/230; 318/231; 307/354
[58] Field of Search ....................... 318/227, 230, 231; 321/66; 307/235 E

[56] References Cited

U.S. PATENT DOCUMENTS

3,703,672  11/1972  Bird et al. ............................ 318/230

*Primary Examiner*—Herman J. Hohauser
*Attorney, Agent, or Firm*—Watts, Hoffmann, Fisher & Heinke Co.

[57] ABSTRACT

Power control apparatus and method for controlling polyphase excitation of a polyphase load. A first sequence of timong pulses are generated to represent each zero level voltage crossing of every phase voltage from a polyphase voltage source. After each of the predetermined numbers of the timing pulses has been generated, an energizng pulse is generated having a width of a predetermined duration. A set of power switches is provided coupling the polyphase source to the load via a set of load lines. The power switches are all rendered conductive to selectively couple phase voltages from the polyphase source to the load by each energizing pulse. This causes excitation of the load via repeating sequences of intermittent power pulses, with each power pulse being comprised of a selected grouping of the phase voltages from the polyphase voltage source. The source phase voltages comprising each group are associated in time with one another on the load lines and are: (1) of a selectable number, and (2) of a selectable permutation of phases. Variance of the rate at which the energizing pulses are generated and of the value of the predetermined duration of the pulse width determines the selected number of and the phase of the voltages in the power pulses. The selected number and phases of the voltages in each power pulse and the repetition rate of the power pulses determine the effective frequency at which the load is excited. In a preferred embodiment the load is a polyphase induction motor, and its speed is fractionally reduced without a great sacrifice in torque by adjusting the repetition rate and the pulse widths of the energizing pulses.

39 Claims, 19 Drawing Figures

POLYPHASE POWER CONTROL

REFERENCE TO RELATED APPLICATION

This application is a continuation-in-part of application Ser. No. 495,783, entitled POLYPHASE POWER CONTROL, filed Aug. 8, 1974, now abandoned which is specifically incorporated herein by reference.

BACKGROUND OF THE INVENTION

This invention relates to power controls for polyphase systems in general and more particularly relates to polyphase power controls which intermittently apply groups of phase voltages from the polyphase source to the polyphase load.

Many systems for varying the operating power applied to a polyphase load in a polyphase system, such as in a polyphase induction motor system, are known, including changing the voltage applied to the load, changing both the voltage and frequency applied to the load, etc. The prior art systems typically result in unstable operation of the load and/or typically require complicated circuitry and are therefore relatively expensive, or have other disadvantages. As examples, when the speed of a polyphase induction motor is controlled by reducing the applied voltage, the slip is increased and the torque is reduced resulting in unstable operation; and changing both the voltage and the frequency of the power applied to a polyphase motor generally requires expensive circuitry which must correlate phases of the frequency to voltage amplitude.

SUMMARY OF THE INVENTION

The present invention provides a new and improved power control apparatus of simplified design and of universal application for exciting a polyphase load over a wide range of frequencies. The present invention overcomes the drawbacks of the prior art by providing polyphase power control apparatus which temporarily gates all switches of a power switch mechanism substantially concurrently to intermittently transmit a repeating sequence of select groupings of phase voltages from a poly-phase source. The phase voltages are respectively generated on a set of load lines and are associated in time as a power pulse which is transmitted to the polyphase load. They occur at a controlled repetition rate, and each is comprised of a selected permutation of successively generated source phase voltages. Each sequence of power pulses is applied to the load to effect one rotation of the resultant MMF vector applied to the load. Proper selection of (1) the particular number of phase voltages in each power pulse, and (2) the permutation of the phase voltages in the power pulses of the sequence causes the MMF vector to rotate every selected number of cycles of the voltage source. This provides excitation to the load at a controllable effective frequency of less than the source frequency.

According to one aspect of the invention as applied in a polyphase system having a polyphase voltage source driving a polyphase load, a first sequence of timing pulses are generated. The timing pulses represent the zero level voltage crossings of each of the phase voltage from the polyphase voltage source. A sequence of energizing pulses are generated, each after a predetermined number of timing pulses has elapsed. The predetermined number is selectable for determining the permutation of the phase voltages in each power pulse, with the particular phase permutations in successive power pulse typically being different. The energizing pulses have pulse widths of controlled durations selected to determine the number of phase voltages in each power pulse.

In a preferred embodiment, a power switch mechanism takes the form of a set of thyristor switches which are connected to the load via the load lines. The thyristor switches have their control inputs coupled to, and are all enabled by, each energizing pulse to transmit selected phase voltages of the source to thereby produce the desired sequence of desired power pulses on the load lines.

In the preferred embodiment, the power control apparatus includes: a pulse former for generating one timing pulse whenever each phase voltage of the source becomes zero; a switch controller for generating to the power switch mechanism the sequence of energizing pulses at a selected repetition rate and having selected pulse widths; and a programmer for programming the switch controller to provide the energizing pulses having the desired repetition rate and the desired pulse widths.

The switch controller includes a programmable counter having data inputs and programming inputs, a pair of serially connected pulse generators coupled to the output of the counter, and a diode matrix coupled to the programming inputs of the counter. The diode matrix couples a set of program signals to the counter for programming its maximum count state. The counter has its data input coupled to the pulse former and counts the timing pulses for producing one counter output pulse whenever a predetermined number (as determined by the programmed maximum count) of timing pulses have elapsed.

The counter output pulse is coupled to the first in series pulse generator. This pulse generator is a delay circuit for adjusting the timing of the energizing pulse so that its leading edge is substantially coincident with a zero crossing of the each respective one of the phase voltages from the source. The next in series pulse generator is a width-forming pulse generator which produces the energizing pulse for transmission to the power switch mechanism. The width-forming pulse generator generates the energizing pulse to have a pulse width of a selectable value which renders all the thyristors of the power switch mechanism conductive to transmit only a selected number of phase voltages as one power pulse. Natural commutation is relief upon for turning the thyristors off.

As one outstanding feature of the present invention, a pulse width-adjusting circuit is coupled between the width-forming pulse generator and the diode matrix. The adjusting circuit applies an adjusting signal to a terminal of the width-forming pulse generator for adjusting the pulse width of the energizing pulses according to the maximum count state programmed into the programmable counter. Accordingly, as the program signals vary for changing the maximum count state of the programmable counter (indicating that a different effective frequency is to be applied to the polyphase load) the pulse width-adjusting circuit causes adjustments to the pulse widths of the energizing pulses.

The programmer includes a multithreshold amplifier arrangement. The amplifier arrangement includes a plurality of output lines which are coupled to the diode matrix. A varying input signal is supplied to the input of the amplifier arrangement. The input signal is an analog signal which is generated to represent any desired speed program, for example, a soft start-soft stop sequence, a program for protecting from underload or overload conditions, or merely a specific load control versus time program. As various thresholds are exceeded by the input signal, the program signal is produced in encoded form and is transmitted on the output lines to the diode matrix. The diode matrix decodes the program signal and couples it to the programmable counter.

A specific object of the invention is to provide a new and improved apparatus of the character referred to for controlling a polyphase induction motor particularly such motors connected to heavy loads, such as a carrier in an overhead material handling system, where an applied voltage sufficient to overcome the static friction and starting inertia may cause the motor to reach full-speed condition without effective control.

As another feature of the invention, the multi-threshold amplifier arrangement has one of the output lines coupled to a brake release mechanism. This output line is actuated in sequence with the other output lines, whereby the brake mechanism is actuated to release a braking force from the motor either before or during transmission of the power pulses to the motor.

In another embodiment, a feedback circuit is directly coupled between the programmable counter and the motor. The feedback circuit monitors the power consumed by the motor and controls (1) the maximum count state into which the counter is programmed and (2) the value of the pulse width of the energizing pulses. The feedback circuit increases the power provided to the motor until its rated maximum is achieved for safely bringing the motor to full speed in the shortest period of time. Feedback control is preferably utilized when a heavy load is encountered, requiring extraordinary start-up power. Alternately the feedback circuit effects a decrease in power provided to the motor upon an overload condition.

Other objects and features will become apparent along with a fuller understanding of the invention by referring to the following description in conjunction with the accompanying drawings wherein:

BRIEF DESCRIPTION OF THE DRAWINGS

FIGS. 6a–6g are exemplary waveforms as produced in the system of FIG. 1;

DETAILED DESCRIPTION OF A PREFERRED EMBODIMENT

Figure 1:
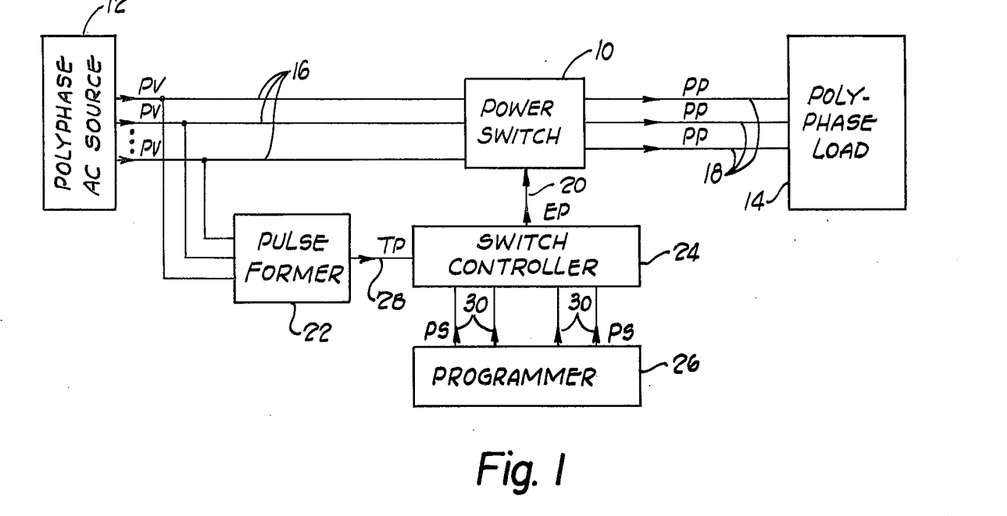
FIG. 1 is a generalized block diagram of a poly-phase system according to the present invention.

Referring now to FIG. 1, a power switch 10 is shown selectively coupling power from a polyphase voltage source 12 to a polyphase load 14. The polyphase source 12 is suitably any n-phase power system, but for ease of description, a three-phase ($n=3$) system will be assumed. Likewise the polyphase load 14 will be assumed three-phase and in the preferred embodiment takes the form of a three-phase induction motor.

The power switch 10 is a thyristor switching arrangement which selectively transmits groupings of phase voltages PV or portions of phase voltages PV on a set of lines 16 from the source 12. The power switch 10 is rendered temporarily conductive for selectively transmitting all the phase voltages or portions thereof as power pulses PP to the polyphase load 14 via a set of lines 18 in response to a sequence of energizing pulses EP on a set of lines 20. The relationship of the power pulses PP to the phase voltages PV is illustrated in FIG. 7b, wherein the power pulses PP are indicated as shaded. The energizing pulses EP operate the power switch 10 to transmit the power pulses PP to the polyphase load 14 such that each power pulse has a selected number of phase voltages and has a selected permutation of these phase voltages. By controlling the repetition rate of the energizing pulse, the effective frequency of the power applied to the polyphase load 14 is controlled.

A pulse former 22, a switch controller 24, and a programmer 26 are provided for generating the energizing pulses EP on the lines 20. The pulse former 22 is responsive to the phase voltages PV on the lines 16 for producing a sequence of timing pulses TP on an output line 28. Each timing pulse TP is indicative of a zero level voltage crossing of a phase voltage PV from the polyphase source 12. The switch controller 24 is responsive to the timing pulses TP for producing the energizing pulses EP. The programmer 26 produces a set of program signals PS on a set of lines 30 for conditioning the switch controller 24. In response to the program signals PS, the switch controller 24 generates the energizing pulses to have selected pulse widths and at a selected repetition rate. The pulse widths and the repetition rate of the energizing pulses EP determine the selected number of phase voltages PV and the selected permutation of the phase voltages PV in each power pulses PP applied to the load 14.

Figures 2, 3:
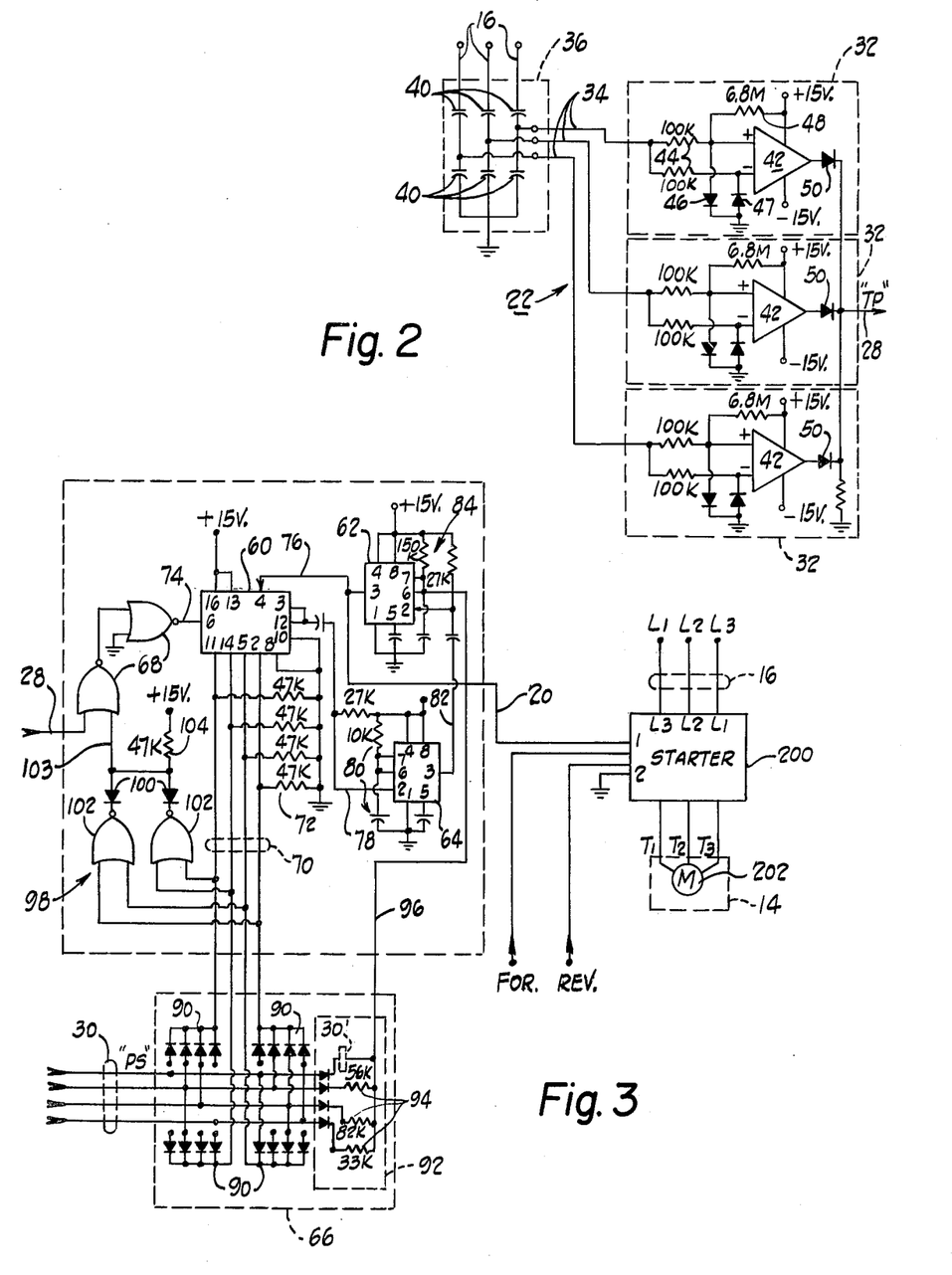
FIG. 2 is a circuit diagram of a pulse former used in the system of FIG. 1.
FIG. 3 is a circuit diagram of a switch controller which is utilized in the system of FIG. 1.

A preferred embodiment of the pulse former 22 is is shown in FIG. 2. The pulse former 22 includes an amplifier arrangement which includes a plurality of differential amplifier circuits 32. The amplifier circuits 32 are respectively coupled via a set of lines 34 to a voltage divider circuit 36. The differential amplifier circuits 32 have their output terminals commonly connected to the line 28 and produce the timing pulses TP. The differential amplifier circuits 32 generate the timing pulses TP as pulses of relatively short duration which are equally spaced within the period corresponding to each voltage cycle of the source 12.

The voltage divider circuit 36 is coupled to the lines 16 for receiving the phase voltages PV. The voltage divider circuit 36 reduces the magnitudes of the phase voltages PV for providing acceptable levels to the differential amplifier circuits 32.

The voltage divider circuit 36 includes a plurality of pairs of serially connected capacitors 40 which couple the respective lines 16 to circuit ground. The lines 34 are connected to the junctions of the respective serially connected capacitors. The values of the capacitors are chosen according to the voltage magnitude of the source 12. In the preferred embodiment the capacitors 40 include sets of 0.003 MFD and 0.1 MFD capacitors with the latter being coupled to circuit ground. This accommodates a source 12 of 480 volts.

The differential amplifier circuits 32 are identical. Accordingly, only one will be described in detail. A differential amplifier 42, such as a Model Ua741 from Signetics Corporation, Sunnyvale, Calif., has its differential inputs coupled through a pair of resistors 44 to a respective one of the lines 34 from the common junction of the series connected capacitors 40. The positive and negative differential inputs are also respectively coupled by a forward and reverse poled set of diodes 46, 47 to circuit ground. A bias resistor 48 is coupled to apply a positive voltage bias to the positive differential input. A forward poled diode 50 is connected to the output terminal of each differential amplifier 42 and to the line 28.

Figures 6, 6A, 6G:
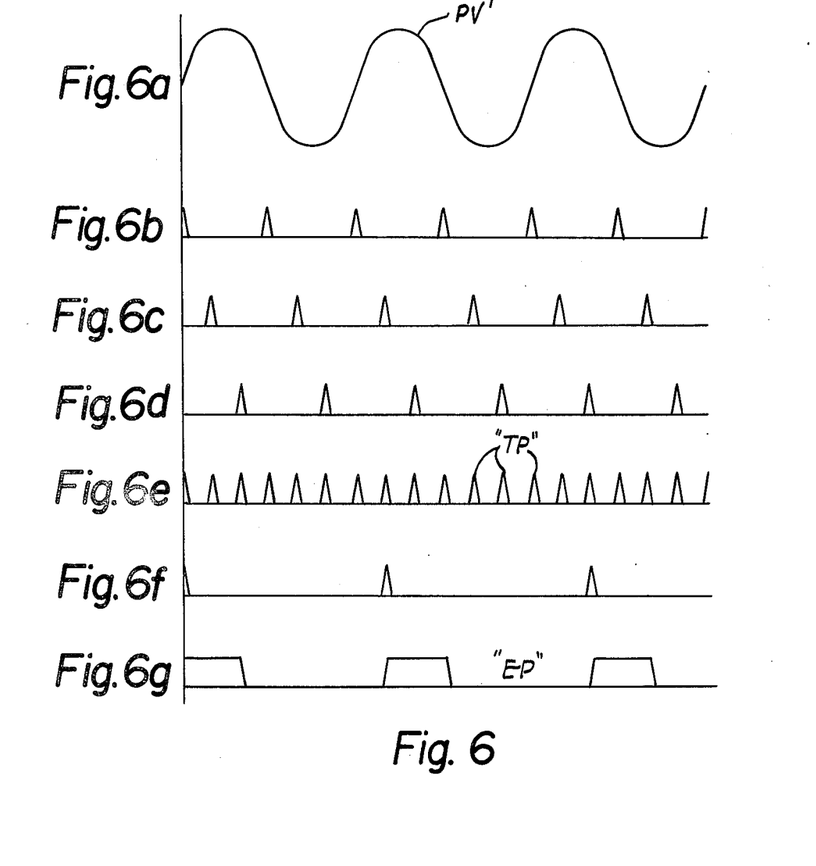

Referring to the waveforms of FIG. 6, the voltage divider circuit 36 provides three PV' signals each of different phase to the lines 34. FIG. 6a shows one of these phase voltages PV' as it is applied to the differential inputs of the differential amplifiers 42. Whenever the value of the signal PV' is larger on the positive (the noninverting) differential input than on the negative (inverting) differential input, the amplifier 42 generates a positive output pulse which is denoted as one of the timing pulses TP. The differential voltage on the differential inputs is produced by the diodes 46, 47. Specifically, during the positive cycle of the phase voltage PV', the signal on the positive differential input is clamped to approximately 0.6 volts while the value of the signal on the negative differential input follows the value of the phase voltage PV' without limitation. As the value of the phase voltage PV' decreases and becomes negative, the voltage on the negative differential input of the amplifier crosses through the zero level prior to the positive differential input, due to the positive bias applied by the resistor 48 to the positive differential input. Shortly thereafter the voltage on the positive differential input becomes negative. During this period the output of the amplifier 42 provides the positive or leading edge of one voltage timing pulse TP. As the voltage increases negatively, the diode 47 clamps the negative differential input to approximately −0.6 volts, while the negative voltage on the positive differential input increases in magnitude. Consequently, the voltage applied to the positive differential input becomes less positive than the voltage applied to the negative differential input and the amplifier 42 returns to a negative state, forming the falling edge of the timing pulse TP.

FIG. 6b shows generation of the timing pulses TP produced as a result of operation of one of the amplifiers 42, while FIGS. 6c and 6d show the timing pulses TP produced by the other amplifiers 42.

The timing pulses as shown in FIGS. 6b–6d from the respective amplifiers 42 are coupled through the diodes 50 and are combined at the commonly connected outputs of the diodes 50 to produce the timing pulses TP on the line 28 as shown in FIG. 6e.

A preferred embodiment of the switch controller 24 is shown in FIG. 3. It includes a programmable counter 60, a width-forming pulse generator 62, a delay pulse generator 64, and a diode matrix 66. The diode matrix 66 decodes and couples the program signals PS from the programmer 26 to the programmable counter 60 for conditioning the counter 60 to count to a predetermined state and then produce a counter output pulse. The counter 60 counts the timing pulses TP which are input through a pair of serially connected logic NOR gates 68 coupled to the line 28. The counter output pulse is coupled to the delay pulse generator 64 which produces a delay pulse after a predetermined amount of delay.

The predetermined amount of delay is adjustable to coordinate the occurrences of the energizing pulses, EP (which are eventually produced in response to the delay pulses), with zero crossings of the phase voltages PV supplied to the power switch 10. The width-forming pulse generator 62 is responsive to each delay pulse and produces the sequence of energizing pulses EP on the line 20.

The programmable counter 60 is any suitable divide-by-n programmable counter, such as a Model MC14526 by Motorola, Inc., Phoenix, Ariz. It has a set of programming inputs coupled to a set of lines 70 which are in turn coupled to the diode matrix 66 to effect conditioning of the maximum count state of the counter 60. Each of the lines 70 are resistively coupled to circuit ground by a set of bias resistors 72. The programmable counter 60 also has a clock input terminal coupled to the logic NOR circuits 68 by a line 74 for receiving the timing pulses TP on the line 28. The counter 60 has a gating input terminal coupled to the width-forming pulse generator 62 by a line 76 for disabling the counter 60 during generation of each energizing pulse EP.

The delay pulse generator 64 is any suitable pulse generator such as a Model LM555 timer by National Semiconductor, Inc., Santa Clara, Calif. A line 78 couples the counter 60 to an input terminal of the timer so that generation of the counter output pulse by the counter 60 actuates the timer. The timer is conditioned according to manufacturer specifications by a resistor/capacitor network 80 to produce the delay pulses after a delay sufficient to cause the delay pulses to actuate the pulse width-forming generator 62 via a line 82. The generator 62 is actuated to produce the leading edge of each energizing pulse EP substantially coincident with a zero crossing of the phase voltages PV from the source 12.

The width-forming pulse generator 62 is any suitable pulse generator, such as a Model LM555 timer by National Semiconductor. The generator 62 has resistor/capacitor circuitry 84 for conditioning the timer to provide a pulse having a width which encompasses a predetermined number of the timing pulses TP. Accordingly, when a delay pulse is received from the delay pulse generator 64, the generator 62 produces the energizing pulse EP on the line 20 substantially upon the occurrence of a zero crossing of one of the phase voltages PV.

The diode matrix 66 includes four sets of diodes 90 which are connected to respective ones of the lines 70. Each set of the diodes 90 has commonly connected cathodes connected to one of the lines 70 and has the anodes of the diodes connectable to the lines 30 for receiving the program signals PS. In this manner, a particular state of the program signals PS can be decoded to provide a signal on the lines 70 which sets the maximum count state of the counter 60 as desired.

An outstanding feature of the invention is the provision of a pulse width-adjusting circuit 92 which connects the diode matrix 66 and the width-forming pulse generator 62. A plurality of resistors 94 of preselected values are coupled to the lines 30 for applying an adjusting signal via a line 96 to a bias terminal of the generator 62 which controls pulse width. In this manner the pulse width of the energizing pulse EP can be adjusted in accordance with the maximum count state of the programmable counter 76. Specifically, as the program signals PS on the lines 30 change value for changing the maximum count state of the counter 60, the adjusting circuit 92 responsively causes variance of the pulse width of the energizing pulses EP to encompass more or less zero crossings of the phase voltages PV. As shown in FIG. 3, the adjusting circuit need not change the pulse width for every change in the program signals PS, as indicated by the lack of connections between connectors 30' and the line 96.

As another feature of the invention, an enable circuit 98 is coupled between the diode matrix and the NOR circuit 60 for enabling the input of timing pulses TP to the counter 60 only when the diode matrix 66 is providing signals on the lines 70 for programming the counter 60. A reverse poled diode 100 and a logic NOR gate 102 are provided for each pair of the lines 70. The anodes of the diodes 100 are commonly connected to the NOR circuit 68 by a line 103 for providing a logic zero state to the NOR circuit 68 only when at least one of the lines 70 is programmed to have a logic one signal. Otherwise, a resistor 104 coupled to a power supply provides a logic one signal to the NOR circuit 68 via the line 103 and disables input of the timing pulses TP.

Figure 4:
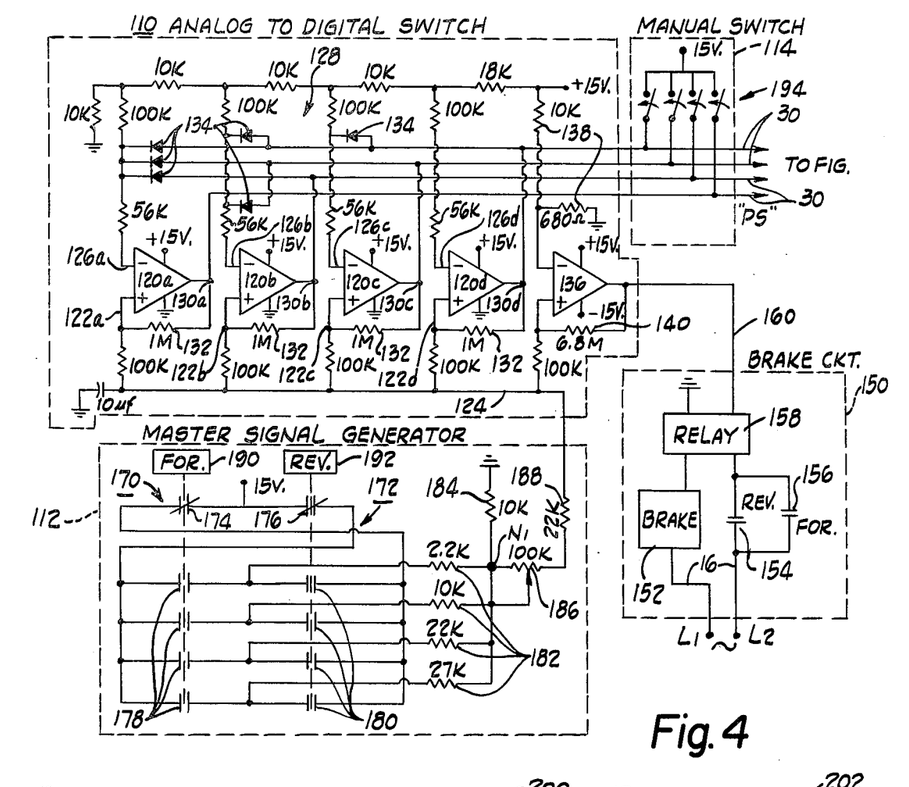
FIG. 4 is a circuit diagram of a programmer circuit employed in the system of FIG. 1.

A preferred embodiment of the programmer 26 is shown in FIG. 4. The programmer 26 includes an analog-to-digital switch 110, a master signal generator 112, and a manual switch 114. The master signal generator 112 generates to the analog-to-digital switch 110 an analog master signal whose value varies with time according to the desired frequency at which the load 14 is to be excited. The analog-to-digital switch 110 is a multithreshold amplifier arrangement which produces the program signal PS having an encoded value corresponding to the number of thresholds exceeded by the analog master signal. The program signal PS is produced on the lines 30 and transmitted to the diode matrix 66 for setting the maximum count state of the counter 60.

Alternately, the master signal generator 112 remains quiescent, and the manual switch 114 is conditioned by the operator of the system for manually generating the program signals PS on the lines 30.

The analog-to-digital switch 110 includes a plurality of differential amplifier circuits 102a–120d each having its respective positive differential input 122a–122d resistively coupled to a line 124 for receiving the analog master signal. The amplifiers 120a–120d have their respective negative differential inputs 126a–126d resistively coupled to a resistive ladder network 128. The resistive ladder network 128 is coupled to a voltage source for providing a series of increasing thresholds to the respective amplifiers 120a–120d. The amplifiers 120 have their outputs respectively coupled by a set of lines 130a–130d to individual ones of the lines 30 for producing the program signals PS. A feedback resistor 132 connects the respective output terminal of each amplifier 120 through its positive differential input 122. The feedback resistors 132 causes the respective amplifiers 120 to ignore slight voltage variations of the analog master signal, such as those caused by switch chatter and noise. The feedback resistor 132 causes the respective amplifiers 120a–120d to latch into a conductive state as soon as the analog master signal exceeds the threshold established on the respective negative differential input 126.

A plurality of diodes 134 couple the respective outputs 130a–130d from each of the amplifiers 120a–120d to the negative differential input to amplifiers having lower thresholds. This assures that only one of the amplifier 120a–120d is in the conductive state at one time, thereby energizing only one of the lines 30 at any one given time. Accordingly, using a four-threshold amplifier arrangement and four lines 30, the program signal PS is a four-bit encoded signal with only one of the bits being a logic one at any given moment.

A fifth amplifier 136 is provided to allow the programmer 26 to program any of various functions to occur in time association with the program signal PS on the lines 30. The amplifier 136 has its positive differential input resistively coupled to the line 124 and has its negative differential input coupled to a resistive voltage divider 138. The voltage divider 138 includes a pair of serially connected resistors coupled between a voltage source and circuit ground for establishing a threshold for the amplifier 136 so that the amplifier 136 is rendered conductive in preselected sequence with the amplifiers 120. The amplifier 136, like the amplifiers 120, has a feedback resistor 140 connecting its output terminal and its positive differential input for minimizing the effects of noise in the analog master signal on the line 24.

One particularly advantageous application of the amplifier 136 is for actuating a brake circuit 150. The brake circuit 150 includes a brake assembly 152 which is to be actuated, a power source in the form of a pair of the lines 16 for operating the brake assembly 152, a pair of normally-open, forward and reversing contacts 154, 156 coupled to the pair of lines 16, and a relay 158. The relay is coupled by a line 160 to the output of the amplifier 136, when energized thereby, for coupling the brake assembly 152 to the contacts 154, 156. Whenever the load 14 (FIG. 1) is being energized, either with forward or reverse energization, one of the contacts 154, 156 closes, allowing the relay 158 to govern operation of the brake assembly 152.

By proper selection of the resistive voltage divider 138, the amplifier 136 is selectively rendered conductive for energizing the relay 158, which in turn energizes the brake assembly 152 according to any desired sequence of load excitation. For example, the programmer 26 could be programmed to initially release the brake before any load excitation, or it could be programmed to release the brake assembly 152 only after an excitation sequence of the load 14 has begun. This is particularly advantageous in hoist systems wherein release of the brake assembly before excitation of a hoisting motor could cause a hoisted object to inadvertently lower.

The master signal generator 112 includes any of a variety of analog signal generator circuits which produce an analog signal representative of a desired function. For example, a programmable voltage source could be programmed for producing an analog signal whose value varies according to time for implementing a timed soft start-soft stop sequence. The master signal generator 112 also includes a manually actuated circuitry which produces an analog signal having a value determined by the degree of manual actuation.

A preferred embodiment of the master signal generator 112 is also shown in FIG. 4 and includes a pair of multicontactor switches 170, 172 each having a normally-closed contact 174, 176 and a plurality of normally-open contacts 178, 180. One set of the terminals of the normally-open contacts 178 are commonly connected, and one set of the terminals of the contacts 180 are commonly connected. The other terminals of the contacts 178 are commonly connected to the respective other terminals of the contacts 180. The normally-closed contact 174 is coupled between the common connection of the contacts 180 and a voltage supply. The normally-closed contact 176 is connected between the common connection of the normally-open contacts 178 and a voltage supply.

A plurality of different valued resistors 182 are coupled between a common node N1 and to the respective junctions between the normally-open contacts 178, 180. A resistor 184 couples the node N1 to circuit ground, and a potentiometer 186 and resistor 188 commonly couple the node N1 to the line 124. The resistors 182, 184, 186, 188 provide a voltage divider network which applies an analog signal on the line 124 according to the degree of actuation of the switches 170, 172.

The switches 170, 172 respectively have actuating sliders 190, 192 which change the states of the contacts 174, 178, 176, 180 according to the degree to which the sliders are depressed. As the sliders 190, 192 are depressed, the associated contacts are progressively moved out of the quiescent state, applying approximately 15 volts across different ones of the different valued resistors 182. The potentiometer 186 and the resistor 188 does not change in value, so the application of approximately 15 volts to selected ones of the resistors 182 produces an analog signal of varying value on the line 124.

The manual switch 114 includes a plurality of switches 194 which are coupled to the lines 30. The switches 194 are normally open and are coupled to a reference potential. Upon closure, the switches 194 selectively apply logic ones to the lines 30. Alternately, the switches 194 could be replaced by a sequence of timed, electronic switches connected in series as disclosed in Ser. No. 495,783, now abandoned.

Figure 5:
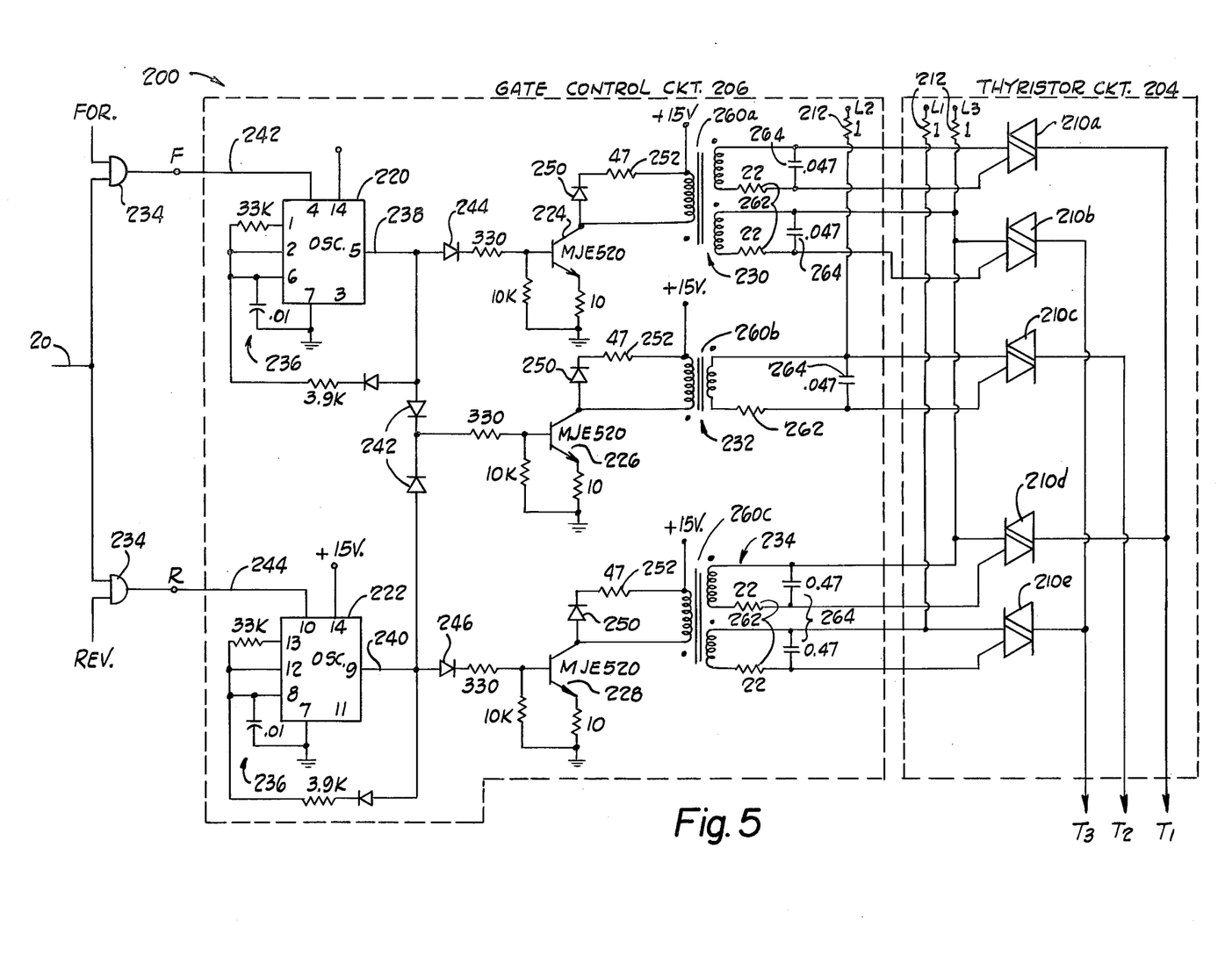
FIG. 5 is a circuit diagram of a power switch employed in the system of FIG. 1.

Referring to FIGS. 3 and 5, a preferred power switch 10 is shown in the form of a motor starter 200 and the polyphase load 14 is a polyphase induction motor 202. The motor starter 200 includes a thyristor circuit 204 having its primary power conducting terminals coupled between the polyphase voltage source 12 and the motor 202, and a gate control circuit 206 coupled to the thyristor circuit 204 for supplying gate excitation. The gate control circuit 206 is responsive to the energizing pulses EP on the line 20 for rendering conductive the thyristor circuit 204 for producing a sequence of power pulses from the phase voltages PV. As seen in FIG. 7b, the power pulses PP which are transmitted by the thyristor circuit 204 to the motor 202 are groups of the phase voltages PV arranged into different permutations. The number of phase voltages or portions thereof within each power pulse PP is determined by the duration of the energizing pulse EP shown in FIG. 7a.

The thyristor circuit 204 includes five triacs 210a–210e. As is well understood, a triac has primary power conducting terminals referred to as terminal 1 and terminal 2, and a gate terminal. Upon the application of a gate pulse (here the energizing pulse EP) on the gate terminal, the triac begins conducting to pass either a negative or a positive pulse on its power terminals. At the expiration of the gate pulse and when current goes to zero, the triac ceases conduction until a subsequent gate pulse is applied.

The terminals 1 of the triacs 210a and 210e are coupled to a line L1 of the lines 16; the terminals 1 of the triacs 210b, 210d, are coupled to a line L3 of the lines 16; and the terminal 1 of the triac 210c is coupled to a line L2 of the lines 16 from the power source 12. The terminals 2 from the triacs 210a, 210d are coupled to a power line T1 of the lines 18 corresponding to the power line L1; the terminals 2 of the triacs 210b, 210e are coupled to a power line T3 of the lines 18 corresponding to the power line L3; and the terminal 2 of the triac 210c is coupled to a power line T2. This interconnection of the triacs 210a–210e allows either reverse or forward excitation to be applied to the motor 202.

Three one-ohm resistors 212, are placed in the respective lines L1–L3 between the source 12 and the triacs 210a–210e. The resistors 212 prevent overloading of the triacs in case inadvertent actuation of a pair of the triacs cause a short circuit between a pair of the power lines 16. For example, if the triacs 210a, 210d were concurrently gated conductive, without the resistors 212, a substantially short circuit would be placed across the lines L1, L3, burning out the triacs 210a, 210d. Use of the resistors 212 provides sufficient loading such that short circuit current is within the rating of the triacs 210.

The gate control circuit 206 energizes selected ones of the triacs 210 to provide for either forward or reverse energization of the motor 202. It includes a pair of high-frequency oscillators 220, 222, three power-switching transistors 224, 226, 228, and three isolation transformer circuits 230, 232, 234. Each oscillator 220, 222 has a control terminal which is coupled by a line 242, 244 respectively to receive the energizing pulse EP on the line 20 through a switch 234 depending on whether forward or reverse excitation of the motor 202 is desired. Its output operates the transistor 226 and one of the transistors 224, 228 which in turn operates selected ones of the triacs 210 through the isolation circuits 232 and 230 or 234.

The oscillators 220, 222 take the form of Model 556 oscillators from Signetics Corporation. Each has a resistor/capacitor bias network for conditioning the output to oscillate at a 5-kilohertz frequency at a 25% duty cycle. Accordingly, a series of 50 microsecond, positive-going pulses are generated which are spaced by approximately 150 microseconds. These signals are generated on the output lines 238, 240 respectively when the oscillator 220 and the oscillator 222 is enabled by the energizing pulse EP.

The output lines 238, 240 are coupled to the transistor 226 through a pair of diodes 242 for rendering the transistor 226 conductive at the 5-kilohertz frequency whenever power is desired to be transmitted to the motor 202. The output line 238 from the oscillator 220 is coupled by a diode 244 to the transistor 224 for rendering the transistor 224 conductive to the 5-kilohertz frequency whenever forward excitation is desired. The output line 240 from the oscillator 222 is coupled by a diode 246 to the transistor 228 for rendering the transistor 228 conductive at the 5-kilohertz frequency whenever reverse excitation is desired.

The transistors 224, 226, 228 are Model MJE520 power amplifiers marketed by Motorola, Inc., Phoenix, Ariz. Each transistor has a series connection of a diode 250 and a resistor 252 coupled to its collector. Voltages developed across the diodes 250 and resistors 252 are coupled to the isolation circuits 230, 232, 234.

The isolation circuits 230–234 each include respective isolation transformers 260a–260b. The transformers 260a, 260c each have a pair of secondary windings which are respectively connected to the lines L1, L3. The transformer 260b has a single secondary which is connected to the power line L2. The isolation transformers 260a-260c each have a resistor 262 and a capacitor 264 coupled to each respective secondary. The primaries of each of the transformers 260a-260c are coupled across the respective diode 250, resistor 252 series combination from the transistors 224-228. The resistor 262 and capacitor 264 are connected in series across each secondary, and the capacitors 264 provide the energizing pulses EP which energize the gate terminals of the triacs 210.

The resistors 262 are utilized for reducing the drive voltage produced by the secondary of the respective transformers 260 to the gate terminals of the triacs 210. The resistors 222 in the secondaries of the transformers 230, 234 also tend to eliminate any triggering of the associated triacs via leakage through the respective transformers 230, 234.

The capacitors 264 are used as filters for preventing false energization of the triacs due to the inadvertent occurrence of voltage spikes.

The starter 200 is not limited to the type described in FIG. 5; that type is a nonzero voltage start version. However, any of several zero-voltage start/zero-current stop, motor starters are commercially available and are suitable for use according to the invention. For example, Model 5AG010N1CAC is suitably obtained from Texas Instruments Incorporated, Dallas, Tex. Another suitable motor starter is Model RSD4842, commercially available from Crydom Division of International Rectifier Corporation, El Selgando, Calif.

Figure 7A:
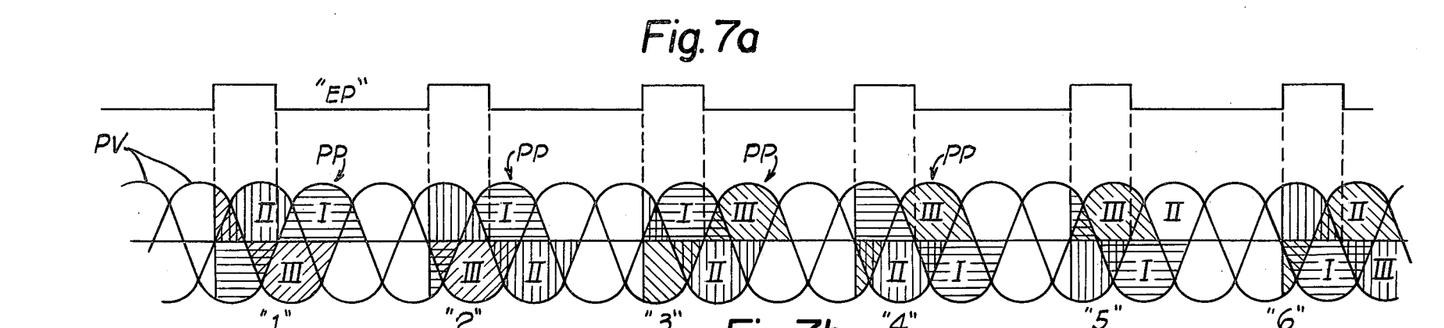
FIGS. 7a–7c, 8a–8c are waveforms representative of the relationship between the phase voltages and the power pulses applied to specific load configurations in the system of FIG. 1; and, FIG. 9 is a functional diagram of a system employing feedback for controlling load excitation.
Figure 7B:
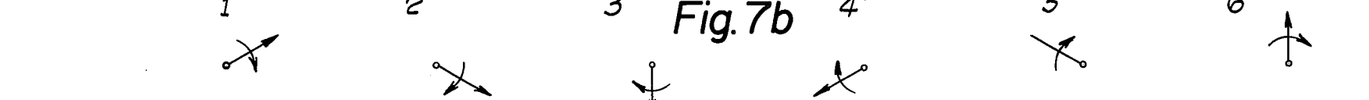
Figures 7C, 8A:
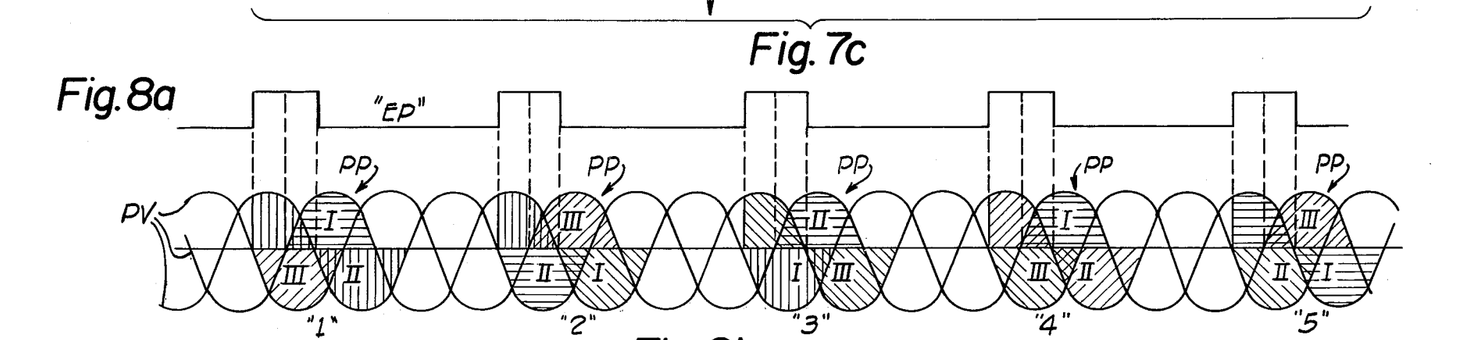

Referring now to FIGS. 7a-7c, the sequence of excitation of the motor 202 is more clearly understood when considering exemplary waveforms. Depicted are the relationships among the energizing pulses EP in FIG. 7a, the phase voltages PV and the power pulses PP (which are shaded) in FIG. 7b, and the resultant magnetic vector applied to the motor 202 in FIG. 7c. The phase voltages are indicated by the Roman numerals I, II, III associated with the respective power lines L1, L2, L3 comprising the lines 16.

Upon the occurrence of each energizing pulse EP, select ones of the triacs 210a-210e are rendered conductive to pass the portions of the phase voltages PV which are present on the lines 16 during the occurrence of each of the pulse EP and until the current in the half-cycle of each phase which was initiated by the pulse of the pulse EP has returned to zero. The waveforms reflect energization of a relatively large motor, wherein there is minimum current lag with respect to voltage. Accordingly, the zero current condition substantially coincides with the zero voltage condition for a given phase voltage.

The exemplary sequence of power pulses PP in FIG. 7b, is shown for a grounded neutral "Y" connected induction motor, provides excitation of the motor 202 at a frequency one-seventh that of the source 12, and depicts a nonzero-voltage start/zero-current stop operation. The one-seventh speed operation is seen by referring to the rotating magnetic vectors of FIG. 7c which complete one clockwise revolution for every seven complete cycles of the source 12. To achieve this reduction of frequency to one-seventh, the pulse duration of the energizing pulse EP was selected to encompass three zero crossings of the phase voltages PV while the programmable counter 60 was programmed to emit a pulse for every seven zero crossings of the phase voltages PV.

As is seen in FIG. 7b, at least a portion of a phase voltage PV is applied to at least one winding of the motor 202 during every given cycle of the source voltage 12. This assures high motor torque even at low motor speeds, as the motor is being pulsed during each cycle of the source 12.

Figure 8B:
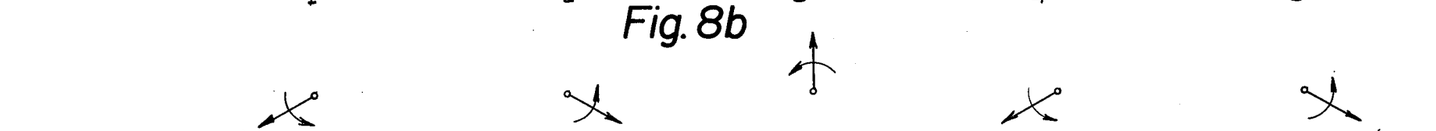
Figure 8C:
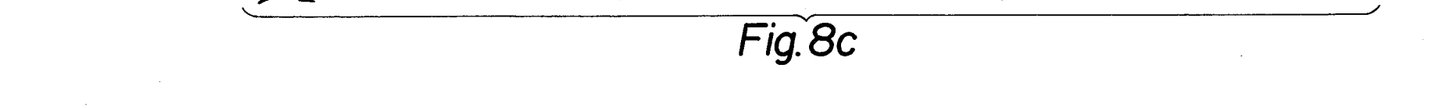

FIGS. 8a-8c depict a set of waveforms which are produced by a nonzero-voltage start/zero-current stop, motor starter driving a "delta" connected, relatively large, induction motor at one-quarter line frequency. For this sequence, the width of the energizing pulse EP is programmed to encompass three zero crossings of the phase voltages PV, and the programmable counter 60 is programmed to emit a pulse every eighth zero crossing of the phase voltages PV. FIG. 8c depicts the resultant magnetic vector from the application of the power pulses PP to the motor 202, and it is seen that the resultant magnetic vectors rotate in a counterclockwise direction by 120° for each group of power pulses PP. Accordingly, an effective frequency of one-quarter source frequency is applied to the motor with a resulting motor speed of one-quarter line frequency.

Other effective frequencies can be supplied to the load 14 by judicious choice of the pulse width of the energizing pulse EP (by proper choice of the adjusting resistor 94) and by judicious choice of the maximum count state programmed into the programmable counter 60. Table I below depicts various effective frequencies obtained according to the selected pulse width of the control signal and program state of the counter 60.

TABLE I

| Pulse Width of EP | Program State of Counter 60 | Effective Frequency Applied to Load | Value of Adjusting Resistor 94 |
|---|---|---|---|
| (FIG. 7) 3 zero crossings | 7 | 1/7 | 82K |
| (FIG. 8) 3 zero crossings | 8 | 1/4 | 82K |
| 1 zero crossing | 12 | 1/5 | 33K |
| 3 zero crossings | 11 | 1/2 | 82K |
| 2 zero crossings | 14 | 2/3 | 56K |
| 4 zero crossings | 1 | Full | ∞ |

The magnetic vectors shown in FIGS. 7c, 8c are not unchanging in magnitude during the conduction. For example, while the vector depicted in FIG. 7c is the resultant vector, the instantaneous vector (not shown) during the conduction period changes both in magnitude and direction. For the depicted waveform for the nonzero-voltage start starter 200, each instantaneous vector starts at a nonzero magnitude and rotates through approximately 180° while diminishing to zero. For the zero-voltage start starter 200, the instantaneous vector for each power pulse starts at zero magnitude at a given orientation and begins rotating clockwise through 120°, reaching an intermediate maximum in magnitude and then declining to zero magnitude at the 120°. These vectors are twisting for providing the increased torque helpful in accelerating loads from an initial rest. Because the instantaneous vector is rotating at a full speed rate during the conduction period, relatively large torque is maintained for a given frequency reduction.

Figure 9:
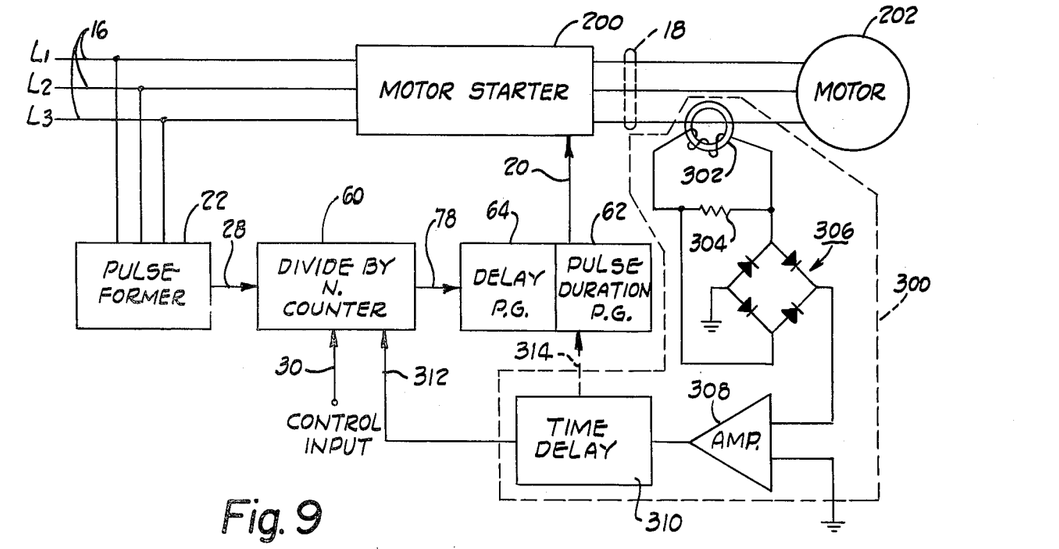

FIG. 9 depicts an embodiment of the invention featuring feedback from the motor 202 for controlling the values of the predetermined period of the energizing pulses EP and of the maximum count state of the programmable counter 60. Occasionally the motor 202 needs to operate at overload capacity. If the motor is used to propel a carrier, and the carried load comprises a large, heavy mass, then a soft start system may be insufficient to accelerate the load acceptably. More specifically, the current through the motor determines motor torque. This current is greatest at initial start-up and decreases as the motor approaches full speed. If high current remains flowing too long a period of time while the soft start sequencer is operating, then it is desirable to apply full power to accelerate the motor. A feedback circuit 300, therefore, is provided to decouple the soft start mechanism and to control the programming of the pulse repetition rate of the counter output signals and of the pulse duration of the energizing pulses on the line 20.

The feedback circuit 300 comprises a power-sensing transformer 302 having a resistor 304 coupled across its output terminals, a rectifying bridge 306, an inverting difference amplifier 308 and a time delay 310. The transformer 302 is a current transformer coupled to one of the lines 18 powering the motor. A shunt, other current sensor, or a wattmeter is also suitably utilized. It provides a signal proportional to current or power drawn by the motor. The rectifying bridge 306 rectifies the signal generated across the resistor 304 and couples it to the inverting amplifier 308. The amplifier 308 drives the time delay circuit 310 for programming the counter 60 and the pulse duration pulse generator 62.

The time delay 310 is typically a resistor/capacitor delay, and its output is fed via a line 312 to the programmable divide-by-$n$ counter 60. The input on the line 312 overrides the program signal on the line 30, and the counter 60 begins the count down by one. That is, the counter 60 begins to output pulses to the pulse former 62 at a rate corresponding to the rate of pulses on the line 28, thereby providing full power to the motor. As soon as the motor current drops to a running level, the signal decreases and the counter 60 resumes its normal mode under control of the program signals PS on the lines 30.

In another embodiment, the duration of the pulses fed to the solid state motor starter 200 is altered via a line 314 for increasing motor torque. When utilizing the National LM555 timing circuit, the line input 314 is resistively coupled to the control input of the pulse generator 62 via connection to the line 96 (FIG. 3). Control of pulse duration is utilized when degree variation of less than full torque is desired.

A combination of signals, both to the pulse generator 62 and to the programmable divide-by-$n$ counter 60, are also suitably utilized. Initially an increased torque which is less than the maximum torque is provided by control of the pulse generator 62. Then, if high motor current persists, maximum torque is provided by control of the divide-by-$n$ counter 60.

It is thus seen that a novel polyphase load control has been described wherein selected power pulses comprising permutated groupings of phase voltages, such as portions of half-cycles, are selectively communicated to the load. A magnetic torque vector may be generated which either revolves clockwise, which revolves counterclockwise or which does not revolve. The latter configuration provides a brake. By selectively reversing the direction of current flo through the coils, reverse motion is provided characterized by the same speed reduction/torque conseration relationship.

The control system of this invention finds particularly advantageous application in systems such as overhead material handling systems wherein tractor or carrier drives a relatively heavy load. An initial voltage of sufficient magnitude to break static friction is initially applied, and thereafter voltage control applies load excitation to bring the load up to full speed controllably and gradually.

This invention also finds application in systems using proximity sensors to avoid collisions between moving powered vehicles, as between overhead trains or tram rail carriers. It is desirous to reduce the speed of or stop the train or carrier overtaking another train or carrier on the same track to avoid collision. The system may advantageously control lighting systems: by providing a slow warm-up period, by preventing large in-rushes of currents, by operating the system at slightly reduced voltage, and by permitting three-phase power to be used for a single resistive load with all phases balanced and without the use of transformers.

Thus, although the invention has herein described in preferred forms with a certain degree of particularity, it is understood that the present disclosure has been made only by way of example. Numerous other changes in the details of construction and application may be resorted to without departing from the spirit and the scope of the invention as hereinafter claimed.

What is claimed is:

1. Power control apparatus coupled to an n-phase voltage source for generating on a set of $n$ lines a repeating sequence of time spaced power pulses, with each power pulse occurring at a controlled repetition rate and comprising a permutation of associated phase voltages on respective lines of said set, at least portions of said associated phase voltages being time coincident, said apparatus comprising:
   a. pulse-forming means coupled to said source for providing a series of timing pulses indicative of zero voltage level crossings of the phase voltages from said source;
   b. circuit means responsive to said timing pulses for selectively providing a series of time spaced energizing pulses at said controlled repetition rate, with each pulse having a predetermined duration, said circuit means including counter means providing one of said energizing pulses every predetermined integer number of timing pulses; and,
   c. power-switching means, including a set of thyristor switches, coupled to said n-phase voltage source for intermittently providing said power pulses; said thyristor switches having their respective control inputs responsive to all said energizing pulses and having their output terminals respectively coupled to ones of said set of lines, wherein the occurrence of one energizing pulse renders all thyristor switches of said set conductive to produce one of the power pulses to be comprised of a preselected permutation of phase voltages, and the occurrence of successive energizing pulses produces a succession of power pulses separated in time by an amount determined by the pulse width and the repetition rate of the succession of energizing pulses.

2. The power control apparatus according to claim 1 wherein said counter means is a programmable counter having programming inputs adapted for setting the maximum count state thereof for determining said predetermined integer number.

3. The power control apparatus according to claim 2 and including programming means coupled to said programming inputs for providing said predetermined integer number.

4. The power control apparatus according to claim 3 wherein the programming means includes a sequencer for providing a series of said predetermined integer numbers in timed sequence.

5. Power control apparatus coupled to an n-phase voltage source for generating on a set of $n$ lines a repeating sequence of time spaced power pulses, with each power pulse occurring at a controlled repetition rate and comprising a permutation of associated phase voltages on respective lines of said set, at least portions of said associated phase voltages being time coincident, said apparatus comprising:
   a. pulse-forming means coupled to said source for providing a series of timing pulses synchronized with each phase voltage of said source;
   b. circuit means responsive to said timing pulses for selectively providing a series of control pulses of said controlled repetition rate and having a predetermined duration, said circuit means including:
      i. counter means for providing an output pulse every predetermined integer number of phase pulses;
      ii. pulse generating means coupled to said counter means for generating said control pulses to have said predetermined durations and to be in a predetermined timed relationship with one of the phase voltages of said source; and,
   c. switching means, including a set of thyristor switches having respective outputs coupled to said set of lines, and having respective control inputs responsive to each of said control pulses, for communicating said associated phase voltages coinciding with said control pulses.

6. The power control apparatus according to claim 5 and further including an induction motor coupled to said set of lines for receiving the power pulses, wherein a sequence of power pulses provides to said motor a torque vector which revolves at a frequency less than the frequency of said source.

7. The power control apparatus according to claim 6 wherein said motor is a "Y" connected motor.

8. The power control apparatus according to claim 6 wherein said motor is a delta connected motor.

9. Power control apparatus providing on a set of lines a repeating sequence of power pulses from an n-phase AC voltage source of frequency F to an n-phase motor, each power pulse comprising on the set of lines a permutation of at least portions of associated and successive half-cycle phase voltages of said source, said power pulses applied to the motor at a predetermined pulse repetition rate and according to a predetermined permutation of the phase voltages for effecting one revolution of the motor per sequence, thereby at a frequency less than F, comprising:
   a. pulse-forming means coupled to said voltage source for providing a series of timing pulses representing each zero level voltage crossing of each phase voltage of the source;
   b. circuit means responsive to said timing pulses for selectively providing a series of energizing pulses of said predetermined repetition rate and having a pulse duration which is time coincident with at least one of the timing pulses; and
   c. switching means, including a plurality of thyristor switches coupling said source and said motor and all having respective control inputs responsive to each energizing pulses, for communicating the phase voltages coinciding with said energizing pulses.

10. The power control apparatus according to claim 9 wherein said circuit means includes a programmable counter, the maximum count state of which determines said pulse repetition rate, and further including automatic sequencing means for programming said counter with a series of different maximum count states to thereby affect soft starting or soft braking of the motor.

11. The power control apparatus according to claim 9 wherein said circuit means includes a programmable counter, the maximum count state of which determines said pulse repetition rate, and further including a set of manually actuable switches for programming the maximum count state of said programmable counter.

12. A method of controlling the speed of a poly-phase motor driven by a polyphase voltage on a set of lines from an n-phase voltage source of frequency F comprising the steps of:
   a. generating a first sequence of timing pulses corresponding to every zero level voltage crossing of every phase voltage of said source;
   b. generating an energizing pulse having a predetermined pulse width every predetermined integer number of timing pulses; and,
   c. coupling all phase voltages of the polyphase source to said motor during intervals corresponding to the occurrence of said energizing pulses.

13. The method according to claim 12 wherein said step of generating an energizing pulse includes the steps of:
   a. feeding back a sensed signal representative of power consumed by the motor; and,
   b. generating said energizing pulse having said pulse width determined in accordance with said sensed signal.

14. The method according to claim 12 wherein said step of generating an energizing pulse includes the steps of:
   a. feeding back a sensed signal representative of power consumed by the motor; and,
   b. generating said energizing pulse every integer number of timing pulses as determined in accordance with said sensed signal.

15. A method for controlling the speed of a polyphase motor driven by a polyphase voltage on a set of lines from an n-phase voltage source comprising the steps of:
   a. generating a first sequence of timing pulses corresponding to every zero level voltage crossing of every phase voltage of said source;
   b. establishing a predetermined integer number of pulses, said integer number varying with motor speed desired;
   c. generating an energizing pulse having a predetermined pulse width every said predetermined integer number of pulses of said first sequence;
   d. selectively coupling all phase voltages of the polyphase source to said motor during intervals corresponding to the occurrence of said energizing pulses, thereby coupling intermittent sequence of at least portions of associated phase voltages of said source to said motor; and, e. thereafter varying said predetermined integer number in accordance with motor speed desired.

16. The method according to claim 15 wherein said step of generating an energizing pulse having a predetermined pulse width comprises generating said energizing pulses having a pulse width which varies with the motor speed desired.

17. Power control apparatus coupled to an n-phase voltage source for generating on a set of lines a repeating sequence of time spaced groups of phase voltage of said source to a load, with each group comprising a permutation of at least portions of phase voltages associated in time on said set of lines, comprising:
   a. pulse-forming means coupled to said voltage source for providing a series of timing pulses synchronized with each phase voltage of the voltage source;
   b. circuit means responsive to said timing pulses for selectively providing a series of energizing pulses, each pulse having a predetermined duration;
   c. switching means coupled to said source and having a set of control inputs responsive to each energizing pulse for communicating the phase voltages on all said lines coinciding with each of said energizing pulses; and,
   d. feedback means coupled to said circuit means and responsive to power consumed by said load for establishing the magnitude of said predetermined duration.

18. Power control apparatus coupled to an n-phase voltage source for generating on a set of lines a repeating sequence of groups of phase voltage of said source to a load, with each group comprising a permutation of at least portions of phase voltages associated in time on said set of lines, comprising:
   a. pulse-forming means coupled to said voltage source for providing a series of timing pulses synchronized with each phase voltage of the voltage source;
   b. circuit means responsive to said timing pulses for selectively providing a series of energizing pulses at a predetermined repetition rate;
   c. switching means coupled to said source and having a set of control inputs responsive to each energizing pulse for communicating the phase voltages on all said lines coinciding with each of said energizing pulses; and,
   d. feedback means coupled to said circuit means and responsive to power consumed by said load for establishing the magnitude of said predetermined repetition rate.

19. Power control apparatus coupled to a polyphase voltage source for generating on a set of lines a repeating sequence of time spaced power pulses, with each power pulse comprising a selected number of, and permutation of, at least portions of time coincident phase voltages on said set of lines from said source, comprising:
   a. pulse-forming means coupled to said source for providing a series of timing pulses in response to phase voltages from such source, said timing pulses being synchronized with each phase voltage from said polyphase source;
   b. a controller responsive to said timing pulses for selectively providing a series of energizing pulses, each energizing pulse having a predetermined duration;
   c. power switch means coupled to said source and having a set of control inputs responsive to each of said energizing pulses for communicating phase voltages on said set of lines coinciding with each said energizing pulse; and,
   d. said controller having means for varying said predetermined duration to thereby vary the selected number of phase voltages in each group of power pulses.

20. The control apparatus according to claim 19 and including programmer means for generating a program signal indicative of a desired repetition rate for the energizing signals, and said controller is responsive to said program signal for generating energizing pulses at the selected repetition rate.

21. The control apparatus according to claim 20 wherein said means for varying is responsive to said program signal for varying said predetermined duration according to the selected rate of said energizing pulses.

22. The control apparatus according to claim 19 wherein said power switch means comprises a plurality of thyristor switches each having a capacitor across its gate terminal and its terminal 1 for improving the noise immunity of the power switch means.

23. The control apparatus according to claim 22 and including a gate resistor coupled to said gate terminal and said capacitor.

24. The control apparatus according to claim 20 wherein said programmer means includes a multithreshold amplifier arrangement having an input terminal for receiving an input signal of varying magnitude and having a plurality of output lines, the amplifier arrangement producing the program signal on the output lines according to the value of said input signal.

25. The control apparatus according to claim 24 wherein the controller includes a programmable, divide-by-$n$ counter having its programming inputs coupled to said output lines for determining said selectable rate at which the energizing pulses are generated in response to said program signal.

26. The control apparatus according to claim 19 wherein:
   a. said controller includes a timer having control terminals for determining said predetermined duration; and,
   b. said means for varying includes resistive means coupled to said control terminals for conditioning said timer to provide the energizing pulses with a desired pulse width.

27. Power control apparatus for coupling a repeating sequence for groups of phase voltages associated in time on a set of lines and at a controlled repetition rate from a polyphase voltage source to a polyphase motor, each said group having a selected number of and a selected permutation of at least portions of each phase voltage of said source, thereby to effect one revolution of said motor per sequence, comprising:
   a. pulse-forming means coupled to said source and responsive to the phase voltages of said source for providing a series of timing pulses synchronized with each phase voltage;
   b. a controller responsive to said timing pulses for selectively providing a series of energizing pulses of said controlled repetition rate, with each control pulse having a selectable pulse width;
   c. power switch means coupled to said source and having a set of control inputs responsive to each said energizing pulses for communicating all phase voltages on said lines coinciding with said energizing pulses; and,
 d. said controller having means for varying said pulse width to thereby vary the selected number of phase voltages in each group.

28. The power control apparatus according to claim 27 and further including a polyphase motor coupled to said power switch means for receiving and being energized by said groups of phase voltages.

29. The control apparatus according to claim 28 and including programmer means for generating a program signal indicative of a desired repetition rate, and wherein said controller is responsive to said program signal for generating the energizing pulses at the selected repetition rate.

30. The control apparatus according to claim 29 wherein said means for varying is responsive to said program signal for varying said predetermined duration according to the selected rate of said energizing pulses.

31. The control apparatus according to claim 28 wherein said power switch means comprises a plurality of thyristor switches each having a capacitor across its gate terminal and its terminal 1 for improving the noise immunity of the power switch means.

32. The control apparatus according to claim 31 and including a set of gate resistors coupled to respective gate terminals and capacitors.

33. The control apparatus according to claim 29 wherein said programmer means includes a multithreshold amplifier arrangement having an input terminal for receiving an input signal of varying magnitude and for producing an output signal on a plurality of output lines according to the value of said input signal, whereby the output signal is encoded as the program signal.

34. The control apparatus according to claim 33 and including a solenoid-operated brake mechanism coupled to said motor and to one of said output lines of said amplifier arrangement, whereby said brake mechanism is released in sequence with the changing in value of said repetition rate.

35. The control apparatus according to claim 33 wherein the controller includes a programmable, divide-by-$n$ counter for determining said selectable rate at which the energizing pulses are generated, the programmable counter having its programming inputs coupled to said output lines for receiving said program signal.

36. The controller apparatus according to claim 27 wherein:
 a. said controller includes a timer having control terminals, for determining said predetermined duration; and,
 b. said means for varying includes resistive means coupled to said control terminals for conditioning said timer to provide the energizing pulses with a desired pulse width.

37. A method for controlling the cyclic excitation of a polyphase load by a polyphase voltage source comprising the steps of:
 a. generating a first sequence of timing pulses corresponding to every zero level voltage crossing of every phase voltage of said source;
 b. establishing a predetermined integer number of timing pulses, said integer number varying with the desired rate of cyclic load excitation;
 c. generating an energizing pulse having a selected pulse width every said predetermined integer number of pulses;
 d. coupling all phase voltages of the polyphase source to said polyphase load during intervals corresponding to the occurrence of said energizing pulses, thereby intermittently coupling a selected sequence of groups of at least portions of time coincident phase voltage to said load; and,
 e. varying said selected pulse width in accordance with different desired rates of cyclic excitation.

38. The method according to claim 37 and including the step of varying said predetermined integer number in accordance with different desired rates of cyclic excitation.

39. The method according to claim 38 wherein said steps of varying include the step of varying the selected pulse width in accordance with the variance of said predetermined integer number.

* * * * *

UNITED STATES PATENT AND TRADEMARK OFFICE
CERTIFICATE OF CORRECTION

PATENT NO. : 4,070,605
DATED : January 24, 1978
INVENTOR(S) : Conrad H. Hoeppner It is certified that error appears in the above-identified patent and that said Letters Patent are hereby corrected as shown below:

Under [57] ABSTRACT, line 3, "timong" should be --timing--.

Column 2, line 48, "relief" should be --relied--.

Column 4, line 44, delete "is" second occurrence

Signed and Sealed this

Sixteenth Day of May 1978

[SEAL]

Attest:

RUTH C. MASON
Attesting Officer

LUTRELLE F. PARKER
Acting Commissioner of Patents and Trademarks